US012790474B2

(12) United States Patent
Kubota et al.

(10) Patent No.: US 12,790,474 B2
(45) Date of Patent: Nov. 10, 2026

(54) THERMOPLASTIC RESIN COMPOSITION AND METHOD FOR PRODUCING SAME

(71) Applicant: MITSUI CHEMICALS, INC., Tokyo (JP)

(72) Inventors: Naoya Kubota, Ichihara (JP); Tetsuya Nakamura, Sodegaura (JP); Toshiyuki Ario, Ogaki (JP); Masayuki Kito, Okazaki (JP)

(73) Assignees: MITSUI CHEMICALS, INC., Tokyo (JP); TOYOTA BOSHOKU KABUSHIKI KAISHA, Kariya (JP)

( * ) Notice: Subject to any disclaimer, the term of this patent is extended or adjusted under 35 U.S.C. 154(b) by 700 days.

(21) Appl. No.: 18/268,100

(22) PCT Filed: Dec. 22, 2021

(86) PCT No.: PCT/JP2021/047592

§ 371 (c)(1),
(2) Date: Jun. 16, 2023

(87) PCT Pub. No.: WO2022/138726

PCT Pub. Date: Jun. 30, 2022

(65) Prior Publication Data

US 2024/0034866 A1 Feb. 1, 2024

(30) Foreign Application Priority Data

Dec. 22, 2020 (JP) ................................ 2020-212577

(51) Int. Cl.

*C08L 23/12* (2006.01)
*C08J 3/00* (2006.01)
*C08L 53/00* (2006.01)

(52) U.S. Cl.

CPC ............... *C08L 23/12* (2013.01); *C08J 3/005* (2013.01); *C08L 53/00* (2013.01); *C08J 2323/12* (2013.01); *C08J 2353/00* (2013.01); *C08J 2451/06* (2013.01); *C08J 2477/02* (2013.01); *C08J 2477/04* (2013.01); *C08L 2205/03* (2013.01); *C08L 2205/08* (2013.01)

(58) Field of Classification Search

CPC ...... C08L 23/12; C08L 77/00; C08L 23/0815; C08L 23/26

See application file for complete search history.

(56) References Cited

U.S. PATENT DOCUMENTS

| | | | | |
|---|---|---|---|---|
| 5,705,565 A * | 1/1998 | Hughes | C08L 51/06 525/65 |
| 9,493,642 B2 | 11/2016 | Kito et al. | |
| 9,840,615 B2 | 12/2017 | Kito et al. | |
| 2014/0371394 A1* | 12/2014 | Kito | C08L 77/02 525/184 |
| 2017/0029610 A1 | 2/2017 | Kito et al. | |
| 2020/0157325 A1 | 5/2020 | Kito et al. | |
| 2020/0180535 A1 | 6/2020 | Kito et al. | |
| 2022/0106473 A1 | 4/2022 | Kito | |

FOREIGN PATENT DOCUMENTS

| | | | |
|---|---|---|---|
| CN | 111647256 | * | 9/2020 |
| EP | 4 183 820 | A1 | 5/2023 |
| JP | H05-262930 | A | 10/1993 |
| JP | 2005-325280 | A | 11/2005 |
| JP | 2007-297441 | A | 11/2007 |
| JP | 2009-203410 | A | 9/2009 |
| JP | 2013-147645 | A | 8/2013 |
| JP | 2013-147648 | A | 8/2013 |
| JP | 2013147645 | * | 8/2013 |
| WO | WO-2020/145013 | A1 | 7/2020 |

OTHER PUBLICATIONS

Translation of JP 2013147645 (Year: 2013).*
Translation of CN111647256 (Year: 2020).*
Mitsui Chemicals Europe GmbH, “Technical data of TAFMER™ M Grades”, 2022, p. 9.

* cited by examiner

*Primary Examiner* — Robert C Boyle
(74) *Attorney, Agent, or Firm* — FOLEY & LARDNER LLP

(57) ABSTRACT

A thermoplastic resin composition containing a polyamide resin (A), a compatibilizer (B) and a polyolefin resin (C), wherein the compatibilizer (B) is a modified ethylene-based elastomer that is modified with an unsaturated carboxylic acid and that has a density of 850 to 870 kg/$m^3$, and a content proportion of the polyamide resin (A) is 15 to 30% by mass, a content proportion of the compatibilizer (B) is 15 to 30% by mass, and a compounding proportion of the polyolefin resin (C) is 45 to 65% by mass, based on 100% by mass of a total content of the polyamide resin (A), the compatibilizer (B) and the polyolefin resin (C).

6 Claims, No Drawings

THERMOPLASTIC RESIN COMPOSITION AND METHOD FOR PRODUCING SAME

CROSS-REFERENCE TO RELATED APPLICATIONS

The present application claims priority under 35 U.S.C. § 371 to International Patent Application No. PCT/JP2021/047592, filed Dec. 22, 2021, which claims priority to and the benefit of Japanese Patent Application No. 2020-212577, filed on Dec. 22, 2020. The contents of these applications are hereby incorporated by reference in their entireties.

TECHNICAL FIELD

The present invention relates to a thermoplastic resin composition and a method for producing the same. More specifically, the present invention relates to a thermoplastic resin composition having excellent stiffness and impact resistance properties and a method for producing the same.

BACKGROUND ART

Polymer blends (including polymer alloys) have been conventionally investigated intensively in which resins with different polarity are mixed together to modify the properties of resins. See, for example, Patent Literatures 1 and 2.

In such cases, insufficient compatibility between resins reduces mechanical properties such as impact resistance properties, and necessitates improvement in compatibility between the resins in some way because the modification effect of polymer blend can not be obtained in some cases.

For example, in the case of a polymer alloy of a polypropylene resin and a polyamide resin, a method of using a compatibilizer such as a maleic anhydride modified-polyolefin has been proposed in order to improve the compatibility. See, for example, Patent Literatures 3 and 4.

CITATION LIST

Patent Literature

[Patent Literature 1] JP2007-297441A
[Patent Literature 2] JP2009-203410A
[Patent Literature 3] JP2013-147645A
[Patent Literature 4] JP2013-147648A

SUMMARY OF INVENTION

Technical Problem

In the field of, for example, automotive interior parts and exterior parts, high mechanical properties are required, and it is essential to achieve both impact resistance properties (in particular low-temperature impact resistance) and stiffness (flexural modulus of elasticity).

However, the aforementioned polymer blends are in a trade-off relationship between the impact resistance properties and stiffness with each other, and those fully satisfying both the impact resistance properties and stiffness have not yet been obtained.

The present invention has been made in view of the aforementioned situations, and an object of the present invention is to provide a thermoplastic resin composition having not only excellent stiffness but also excellent impact resistance properties (in particular low-temperature impact resistance), and a method for producing the same.

Solution to Problem

The present inventors have found, as a result of diligent investigations to solve the aforementioned problems, that the above problems can be solved, by not only using an unsaturated carboxylic acid-modified ethylene-based elastomer with a specific density as a compatibilizer, in a thermoplastic resin composition containing a polyamide resin, the compatibilizer and a polyolefin resin, but also by setting a specific compounding proportion of these components, and thus have completed the present invention.

That is, the thermoplastic resin composition of the present invention contains a polyamide resin (A), a compatibilizer (B) and a polyolefin resin (C), wherein the compatibilizer (B) is a modified ethylene-based elastomer that is modified with an unsaturated carboxylic acid and that has a density of 850 to 870 kg/m$^3$, and a content proportion of the polyamide resin (A) is 15 to 30% by mass, a content proportion of the compatibilizer (B) is 15 to 30% by mass, and a compounding proportion of the polyolefin resin (C) is 45 to 65% by mass, based on 100% by mass of a total content of the polyamide resin (A), the compatibilizer (B) and the polyolefin resin (C).

The method for producing a thermoplastic composition of the present invention includes a step of melt kneading a resin obtained by melt kneading a polyamide resin (A) and a compatibilizer (B), with a polyolefin resin (C).

Advantageous Effects of Invention

According to the present invention, it is possible to provide a thermoplastic resin composition with excellent stiffness and impact resistance properties (in particular low-temperature impact resistance).

DESCRIPTION OF EMBODIMENTS

The present invention will be described in detail below.

[1] Thermoplastic Resin Composition

A thermoplastic resin composition of the present invention contains a polyamide resin (A), a compatibilizer (B) and a polyolefin resin (C), wherein the compatibilizer (B) is a modified ethylene-based elastomer that is modified with an unsaturated carboxylic acid and that has a density of 850 to 870 kg/m$^3$, and a content proportion of the polyamide resin (A) is 15 to 30% by mass, a content proportion of the compatibilizer (B) is 15 to 30% by mass, and a compounding proportion of the polyolefin resin (C) is 45 to 65% by mass, based on 100% by mass of a total content of the polyamide resin (A), the compatibilizer (B) and the polyolefin resin (C).

(1-1) Each Component

<Polyamide Resin (A)>

The polyamide resin (A) is a polymer having a chain backbone in which a plurality of monomers is polymerized via an amide bond (—NH—CO—). Moreover, it is a resin that forms a dispersed phase for the polyolefin resin (C) described below in the thermoplastic resin composition of the present invention.

Examples of the monomers constituting the polyamide resin (A) include amino acids such as aminocaproic acid, aminoundecanoic acid, aminododecanoic acid, para-aminomethylbenzoic acid, lactams such as ε-caprolactam, undecane lactam, ω-lauryllactam, and the like. These monomers may be used singly, or may be used in combinations of two or more thereof. The polyamide resin (A) can also be obtained by copolymerization of a diamine and a dicarboxylic acid.

Examples of diamines as the aforementioned monomers include aliphatic diamines such as ethylenediamine, 1,3-diaminopropane, 1,4-diaminobutane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane, 2-methyl-1,5-diaminopentane, and 2-methyl-1,8-diaminooctane, alicyclic diamines such as cyclohexanediamine and bis-(4-aminocyclohexyl)methane, and aromatic diamines such as xylylenediamines (such as p-phenylenediamine and m-phenylenediamine). These monomers may be used singly, or in combination of two or more thereof.

Examples of dicarboxylic acids as the above monomers include aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, brassylic acid, tetradecanedioic acid, pentadecanedioic acid, and octadecanedioic acid, alicyclic dicarboxylic acids such as cyclohexanedicarboxylic acid, and aromatic dicarboxylic acids such as phthalic acid, terephthalic acid, isophthalic acid, and naphthalene dicarboxylic acid. These monomers may be used singly, or in combination with two or more thereof.

In the present invention, the polyamide resin (A) is preferably a polyamide resin containing in its main chain an amide bond-containing unit having 11 carbon atoms. In other words, it is preferably a polyamide resin including a constituent unit derived from a monomer having 11 carbon atoms, and particularly a polymer using 11-aminoundecanoic acid or undecane lactam as a monomer (this polymer may be also hereinafter referred to as "PA11-based resin"). In particular, 11-aminoundecanoic acid is desired from the viewpoint of environmental protection (particularly from the viewpoint of carbon neutrality) because it is a monomer obtained from castor oil.

A proportion of the constituent unit derived from these monomers having 11 carbon atoms is preferably 50% or more based on the total constituent units in the PA11-based resin. That is, a constituent unit derived from monomers having less than 11 carbon atoms and/or a constituent unit derived from monomers having 12 carbon atoms or more can be included at a proportion of less than 50% based on the total constituent units in the PA11-based resin. Furthermore, in the PA11-based resin, all of its constituent units may be constituent units derived from monomers having 11 carbon atoms. That is, the polyamide resin (A) may be polyamide 11 (PA11).

Further, in the present invention, examples of preferred polyamide resin (A) other than the aforementioned PA11-based resin include polyamide 6, polyamide 66, polyamide 610, polyamide 612, polyamide 614, polyamide 12, polyamide 6T, polyamide 6I, polyamide 9T, polyamide M5T, polyamide 1010, polyamide 1012, polyamide 10T, polyamide MXD6, polyamide 6T/66, polyamide 6T/6I, polyamide 6T/6I/66, polyamide 6T/2M-5T, and polyamide 9T/2M-8T. Of these (also including the PA11-based resin), preferable are polyamide 11, polyamide 12, polyamide 612, polyamide 610, polyamide 1010 and polyamide 6.

The polyamide resins (A) may be used singly or in combinations of two or more thereof.

When the PA11-based resin is used in combination with other polyamides, the content proportion of other polyamides can be less than 40% by mass, based on 100% by mass in total of the polyamide resin (A).

In the polyamide resin (A), half or more (50% or more) of carbon atoms among the carbon atoms constituting the main chain preferably constitute the chain backbone. In other words, the polyamide resin (A) may include an aromatic backbone, but the content of carbon atoms constituting the aromatic backbone is preferably less than half (less than 50%) of the carbon atoms constituting the main chain.

A weight-average molecular weight (in terms of polystyrene) of the polyamide resin (A) by gel permeation chromatography (GPC) is not particularly limited, but is preferably from 5,000 to 100,000, more preferably from 7,500 to 50,000, and further preferably from 10,000 to 50,000.

<Compatibilizer (B)>

The compatibilizer (B) is a modified ethylene-based elastomer that is modified with an unsaturated carboxylic acid and that has a density of 850 to 870 kg/$m^3$. By using the unsaturated carboxylic acid-modified ethylene-based elastomer with the density within the above range, a thermoplastic resin composition having excellent stiffness and impact resistance (in particular low-temperature impact resistance) can be obtained.

Examples of ethylene-based elastomers (backbone resins) before modification to obtain the above modified ethylene-based elastomer include an olefinic thermoplastic elastomer composed of a polymer of ethylene and α-olefin having 3 to 8 carbon atoms.

Examples of the above olefinic thermoplastic elastomer include an ethylene·propylene copolymer (EPR), an ethylene·1-butene copolymer (EBR), an ethylene·1-pentene copolymer, and an ethylene·1-octene copolymer (EOR). Of these, preferable are particularly EPR, EBR, and EOR.

Examples of unsaturated carboxylic acid compounds used to modify the above olefinic thermoplastic elastomers include maleic anhydride, phthalic anhydride, itaconic anhydride, citraconic anhydride, tetrahydro phthalic anhydride, and butenyl succinic anhydride. Of these, preferable are maleic anhydride, phthalic anhydride, and itaconic anhydride, with maleic anhydride being particularly preferred.

These monomers may be used singly or in combinations of two or more thereof.

Specific examples of modified ethylene-based elastomers used as the compatibilizers (B) include maleic anhydride-modified olefinic thermoplastic elastomers such as maleic anhydride-modified EPR, maleic anhydride-modified EBR and maleic anhydride-modified EOR.

The compatibilizers (B) may be used singly or in combinations with two or more of thereof.

A weight-average molecular weight (in terms of polystyrene) of the compatibilizer (B) by GPC is not particularly limited, but preferably 10,000 to 500,000, more preferably 20,000 to 500,000, and further preferably 30,000 to 300,000.

<Polyolefin Resin (C)>

The polyolefin resin (C) is a resin that forms a continuous phase with respect to the polyamide resin (A) in the thermoplastic resin composition of the present invention.

The polyolefin resin (C) is not particularly limited, and various polyolefins can be used. Examples thereof include an ethylene homopolymer, a propylene homopolymer, an ethylene·propylene copolymer, an ethylene·α-olefin copolymer, and a propylene·α-olefin copolymer, with the polypropylene resin being preferred.

The above α-olefins are usually unsaturated hydrocarbon compounds having 3 to 20 carbon atoms, and examples include propylene, 1-butene, 1-pentene, 1-hexene, 1-heptene, 3-methyl-1-butene, and 4-methyl-1-pentene.

These polyolefin resins (C) may be used singly or in combinations of two or more thereof. In other words, the polyolefin resin may be a mixture of the above polymers.

A weight-average molecular weight (in terms of polystyrene) of the polyolefin resin (C) by GPC is not particularly limited, but preferably ranges from 10,000 to 500,000, more preferably from 100,000 to 450,000, and further preferably from 200,000 to 400,000.

The polyolefin resin (C) differs from a polyolefinic component as the compatibilizer (B) described above in that the polyolefin resin (C) is a polyolefin having no affinity for the polyamide resin (A) and also having no reactive groups that can react with the polyamide resin (A).

(1-2) Thermoplastic Resin Composition

In the thermoplastic resin composition of the present invention,

- a content proportion of a component derived from the polyamide resin (A) is 15 to 30% by mass, preferably 15 to 25% by mass, and a content proportion of a component derived from the compatibilizer (B) is 15 to 30% by mass, preferably 20 to 30% by mass, and
- a content proportion of a component derived from the polyolefin resin (C) is 45 to 65% by mass, preferably 50 to 60% by mass, based on 100% by mass of the total content of the polyamide resin (A), the compatibilizer (B) and the polyolefin resin (C).

Moreover, the thermoplastic resin composition of the present invention contains the polyamide resin (A) dispersed in the polyolefin resin (C). In particular, a smaller particle size of the dispersed polyamide resin (A) is preferable. In other words, the polyamide resin (A) is preferably finely dispersed in the polyolefin resin (C), which is a matrix phase.

An average particle size of the dispersed polyamide resin (A) is preferably from 10 to 20,000 nm, more preferably from 50 to 10,000 nm, and further preferably from 100 to 5,000 nm. The aforementioned particle size, for example, can be measured based on, for example, images obtained by using an electron microscope.

The thermoplastic resin composition of the present invention is a composition obtained by melt kneading a resin obtained by melt kneading the polyamide resin (A) and the compatibilizer (B) (hereinafter also referred to as "mixed resin"), with the polyolefin resin (C).

[2] Method for Producing Thermoplastic Resin Composition

The method for producing the thermoplastic resin composition of the present invention includes a step of melt kneading a mixed resin obtained by melt kneading the polyamide resin (A) and the compatibilizer (B), with the polyolefin resin (C) (hereinafter also referred to as "mixing step").

The aforementioned "mixing step" is a step of melt kneading a mixed resin obtained by melt kneading the polyamide resin (A) and the compatibilizer (B), with the polyolefin resin (C).

In this way, using a mixed resin obtained by preliminarily melt kneading the polyamide resin (A) and the compatibilizer (B) allows the compatibilizer (B) to function more effectively. In other words, preliminarily mixing the compatibilizer (B) with the polyamide resin (C) that is to be a dispersed phase, is considered to make it possible to inhibit the compatibilizer (B) from dispersing solely in the polyolefin resin (C) without functioning.

The aforementioned "mixed resin" may be in a solidified form by, for example, pelletization, or in a molten form.

This mixed resin can be obtained, for example, by melt kneading the polyamide resin (A) and the compatibilizer (B) using a kneading apparatus such as an extruder (such as a single-screw extruder and a twin-screw kneading extruder), a kneader or a mixer (such as a high-speed flow mixer, a paddle mixer, and a ribbon mixer). One type of these apparatuses may be used, or two or more thereof may be used in combination. When two or more types are used, they may be operated continuously or batchwise (in batch mode). Furthermore, the polyamide resin (A) and the compatibilizer (B) may be mixed altogether, or either one of them may be added and fed in a plurality of times (multi-stage compounding) for the mixing.

A mixing temperature upon melt kneading the polyamide resin (A) and the compatibilizer (B) is not particularly limited, and can be appropriately adjusted according to a type of each component. In particular, each compound is preferably mixed in a molten state. Specifically, this mixing temperature is preferably from 190 to 350° C., more preferably from 200 to 330° C., and further preferably from 205 to 310° C.

In the aforementioned mixing step, the above mixed resin and the polyolefin resin (C) can be melt kneaded, for example, by using a kneading apparatus such as an extruder (such as a single-screw extruder and a twin-screw kneading extruder), a kneader or a mixer (such as a high-speed flow mixer, a paddle mixer, and a ribbon mixer). One type of these apparatuses may be used, or two or more types thereof may be used in combination. When two or more types are used, they may be operated continuously or batchwise (in batch mode). Furthermore, the above mixed resin and the polyolefin resin (C) may be mixed altogether, or either of them may be added and fed in a plurality of times (multi-stage compounding) for the mixing.

A mixing temperature in the aforementioned mixing step is not particularly limited, and can be appropriately adjusted according to a type of each component, as long as it is a temperature at which the melt kneading can be performed. In particular, any of the compounds is preferably mixed in a molten state. Specifically, this mixing temperature is preferably from 190 to 350° C., more preferably from 200 to 330° C., and further preferably from 205 to 310° C.

In the aforementioned mixing step, (1) the mixed resin solidified by, for example, pelletization, and the polyolefin resin (C) may be melt kneaded, or (2) with, for example, a multi-stage compounding kneader, the polyamide resin (A) and the compatibilizer (B) may be melt kneaded on the upstream side of the kneader and the polyolefin resin (C) may be added on the downstream side in the same apparatus, to then mix a melt kneaded product (the mixed resin) of the polyamide resin (A) and the compatibilizer (B) with the polyolefin resin (C).

In the method for producing the thermoplastic resin composition of the present invention, a compounding proportion of the polyamide resin (A) is 15 to 30% by mass, preferably 15 to 25% by mass, a compounding proportion of the compatibilizer (B) is 15 to 30% by mass, preferably 20 to 30% by mass, and a compounding proportion of the polyolefin resin (C) is 45 to 65% by mass, preferably 50 to 60% by mass, based on 100% by mass of the total amount of the polyamide resin (A), the compatibilizer (B) and the polyolefin resin (C) compounded.

Moreover, in the present invention, other components other than the polyamide resin (A), compatibilizer (B) and polyolefin resin (C) may be contained to the extent that other components do not impair the purpose of the present invention. Examples of other components include other thermoplastic resins other than the aforementioned resins, flame retardants, flame retardant aids, fillers, coloring agents, antibacterial agents, and antistatic agents. These may be used singly or in combinations of two or more thereof.

Examples of the aforementioned other thermoplastic resins include polyester-based resins (polybutylene terephthalate, polyethylene terephthalate, polycarbonate, polybutylene succinate, polyethylene succinate, polylactic acid).

Examples of the aforementioned flame retardant include halogen-based flame retardants (halogenated aromatic compounds), phosphorus-based flame retardants (such as nitrogen-containing phosphate salt compounds, and phosphate esters), nitrogen-based flame retardants (such as guanidine, triazine, melamine, and derivatives thereof), inorganic-based flame retardants (such as metal hydroxides), boron-based flame retardants, silicone-based flame retardants, sulfur-based flame retardants, and red phosphorus-based flame retardants.

Examples of the aforementioned flame retardant aids include various antimony compounds, metal compounds containing zinc, metal compounds containing bismuth, magnesium hydroxide, and clay silicates.

Examples of the aforementioned fillers include glass components (such as glass fibers, glass beads, and glass flakes), silica, inorganic fibers (glass fibers, alumina fibers, carbon fibers), graphite, silicate compounds (such as calcium silicate, aluminum silicate, kaolin, talc, and clay), metal oxides (such as iron oxide, titanium oxide, zinc oxide, antimony oxide, and alumina), carbonates and sulfates of metals such as calcium, magnesium, zinc, and organic fibers (such as aromatic polyester fibers, aromatic polyamide fibers, fluororesin fibers, polyimide fibers, and vegetable fibers).

The aforementioned coloring agents include, for example, pigments and dyes.

[3] Molded Body

The thermoplastic resin composition of the present invention may be molded in any form, and the method thereof is not particularly limited. Further, for example, the shape, size, thickness of the resulting molded body are also not particularly limited, nor are its uses. The aforementioned molded bodies are used, for example, as exterior materials, interior materials, and structural materials, for, for example, automobiles, railcars, ships, and airplanes. Among these, examples of automotive parts include automotive exterior materials, automotive interior materials, automotive structural materials, and engine compartment interior parts. Specific examples thereof include bumpers, spoilers, cowlings, front grilles, garnishes, hoods, trunk lids, fender panels, door panels, roof panels, instrument panels, door trims, quarter trims, roof linings, pillar garnishes, deck trims, tonneau boards, package trays, dashboards, console boxes, kicking plates, switch bases, seat back boards, seat frames, armrests, sun visors, intake manifolds, engine head covers, engine under covers, oil filter housings, housings for automotive electronic components (such as ECUs and TV monitors), and air filter boxes. Furthermore, examples thereof include interior materials, exterior materials, and structural materials for, for example, buildings and furniture. In other words, for example, door surface materials, door structural materials, and surface materials, structural materials, of various types of furniture (such as desks, chairs, shelves, and chests) are included. Other examples include packaging, containers (such as trays), protective members, and partition members. Further, they can be applied for housings and structures for home appliances (such as flat-screen TVs, refrigerators, washing machines, vacuum cleaners, cellular phones, portable game consoles, and notebook PCs).

EXAMPLES

The present invention will be more specifically described below based on Examples, however, the present invention is not limited in any way to these examples.

SYNTHESIS EXAMPLE

The ethylene·1-butene copolymer shown in Table 1 below was used to produce a maleic anhydride grafted modified ethylene·1-butene copolymer.

TABLE 1

| Polymer properties of ethylene•1-butene copolymer | Units | B-1 | B-2 |
|---|---|---|---|
| Density | $kg/m^3$ | 861 | 885 |
| MFR (190° C., 2.16 kg load) | g/10 minutes | 0.5 | 0.5 |
| Mw/Mn | — | 2.0 | 2.1 |

Synthesis Example 1

10 kilograms of an ethylene·1-butene copolymer (B-1) were blended with a solution in which 60 g of maleic anhydride and 3 g of 2,5-dimethyl-2,5-bis(tert-butylperoxy) hexene-3 were dissolved in 50 g of acetone, in a Henschel mixer.

The resulting blend was then fed via a hopper of a twin-screw extruder having a screw diameter of 30 mm and L/D=42, and extruded into strands at a resin temperature of 260° C. and an extrusion rate of 7 kg/hr. Then, after water cooling, it was pelletized to obtain a maleic anhydride grafted modified ethylene·1-butene copolymer (b-1).

The obtained copolymer (b-1) had an MFR (190° C., 2.16 kg load) of 1.2 g/10 minutes, a density of 865 $kg/m^3$, and the content of maleic anhydride grafted of 0.47% by mass as measured after having extracted unreacted maleic anhydride with acetone.

Synthesis Example 2

A maleic anhydride grafted modified ethylene·1-butene copolymer (b-2) was obtained in the same manner as in Synthesis Example 1 except that the amounts of maleic anhydride, 2,5-dimethyl-2,5-bis(tert-butylperoxy)hexene-3, and acetone were changed to 110 g, 6 g, and 80 g, respectively.

The obtained copolymer (b-2) had an MFR (190° C., 2.16 kg load) of 0.6 g/10 minutes, a density of 866 $kg/m^3$, and the content of maleic anhydride grafted of 0.99% by mass as measured after having extracted unreacted maleic anhydride with acetone.

Synthesis Example 3

A maleic anhydride grafted modified ethylene·1-butene copolymer (b-3) was obtained in the same manner as in Synthesis Example 1 except that the amounts of maleic anhydride, 2,5-dimethyl-2,5-bis(tert-butylperoxy)hexene-3, and acetone were changed to 230 g, 12 g, and 100 g, respectively.

The obtained copolymer (b-3) had an MFR (190° C., 2.16 kg load) of 0.5 g/10 minutes, a density of 870 kg/m$^3$, and the content of maleic anhydride grafted of 1.93% by mass as measured after having extracted unreacted maleic anhydride with acetone.

Synthesis Example 4

A maleic anhydride grafted modified ethylene·1-butene copolymer (b-4) was obtained by synthesizing in the same manner as in Synthesis Example 2 except that the amount of ethylene·1-butene copolymer (B-1) was changed to 7.5 kg, and further 2.5 kg of ethylene·1-butene copolymer (B-2) was used.

The obtained copolymer (b-4) had an MFR (190° C., 2.16 kg load) of 0.7 g/10 minutes, a density of 873 kg/m$^3$, and the content of maleic anhydride grafted of 0.95% by mass as measured after having extracted unreacted maleic anhydride with acetone.

Example 1

(1) Preparation of Mixed Resin

PA11 (nylon 11 resin, product name: "Rilsan BMN O," melting point 190° C., manufactured by Arkema Corporation) was used as a polyamide resin, the modified elastomer (b-1) obtained in Synthesis Example 1 was used as a compatibilizer, and these pellets were dry blended so that they were compounded in amounts listed in Table 2 and the blend was then fed into a twin-screw melt kneading extruder (screw diameter 30 mm, L/D=42, manufactured by The Japan Steel Works, Ltd.). Thereafter, the fed blend was mixed at a kneading temperature of 245° C., an extrusion rate of 15 kg/hour, and a screw speed of 200 rpm, and the mixed resin extruded was further cut by using a pelletizer to fabricate mixed resin pellets.

(2) Mixing Step

Next, a polypropylene resin (a homopolymer, product name "Prime Polypro J106G," melting point 163° C., manufactured by Prime Polymer Co., Ltd.) (hereinafter also referred to as "hPP"), was used as a polyolefin resin, and dry blended with the mixed resin pellets obtained previously so that they were compounded in amounts listed in Table 2, and then fed into a twin-screw melt kneading extruder (screw diameter 30 mm, L/D=42, manufactured by The Japan Steel Works, Ltd.). Thereafter, the fed blend was mixed at a kneading temperature of 245° C., an extrusion rate of 15 kg/hour, and a screw speed of 200 rpm, and furthermore, the extruded thermoplastic resin composition was cut by using a pelletizer to fabricate pellets of a thermoplastic resin composition.

The pellets of the resulting thermoplastic resin composition were then fed into a hopper of a 50-ton injection molding machine (manufactured by Meiki Co., Ltd.), and a test piece for stiffness measurement was injection molded under injection conditions of a set temperature of 210° C. and mold temperature of 40° C. Similarly, a 70-ton injection molding machine (manufactured by Meiki Co., Ltd.) was used to injection mold a test piece for a puncture impact test under injection conditions of a set temperature of 210° C. and a mold temperature of 40° C.

(3) Evaluation of Stiffness (Measurement of Flexural Modulus of Elasticity)

The flexural modulus of elasticity was measured in accordance with JIS K7171 using the test piece for physical properties measurements obtained in (2) above. Table 2 shows the results. Note that the flexural modulus of elasticity was measured by applying a load at a rate of 2 mm/min from the point of action (radius of curvature 5 mm) arranged at the center between fulcrums while the test piece was supported at two fulcrums (radius of curvature 5 mm) with a distance (L) of 64 mm between the fulcrums.

(4) Puncture Impact Test

The puncture impact test was performed by using the test piece (thickness: 1 mm) obtained in (2) above at 23° C. and −30° C. under the condition of a test rate of 5 m/s in accordance with JIS K7211. Table 2 shows the results.

Example 2

Pellets of a thermoplastic resin composition were fabricated in the same manner as in Example 1, except that the modified elastomer (b-2) obtained in Synthesis Example 2 was used as a compatibilizer and each pellet was dry blended so that it was compounded in the amount listed in Table 2, and a test piece for physical properties measurements was injection molded and then evaluated. Table 2 shows the results.

Example 3

Pellets of a thermoplastic resin composition were fabricated in the same manner as in Example 1, except that the modified elastomer (b-3) obtained in Synthesis Example 3 was used as a compatibilizer and each pellet was dry blended so that it was compounded in the amount listed in Table 2, and a test piece for physical properties measurements was injection molded and then evaluated. Table 2 shows the results.

Comparative Example 1

Pellets of a thermoplastic resin composition were fabricated in the same manner as in Example 1, except that the modified elastomer (b-4) obtained in Synthesis Example 4 was used as a compatibilizer and each pellet was dry blended so that it was compounded in the amount listed in Table 2, and a test piece for physical properties measurements was injection molded and then evaluated. Table 2 shows the results.

Example 4

Pellets of a thermoplastic resin composition were fabricated in the same manner as in Example 2, except that a polypropylene resin (product name "J-762HP," block polymer, manufactured by Prime Polymer Co., Ltd.) (hereinafter also referred to as "bPP") as a polyolefin resin was used, and a test piece for physical properties measurements was injection molded and then evaluated. Table 2 shows the results.

Example 5

Pellets of a thermoplastic resin composition were fabricated in the same manner as in Example 3, except that a polypropylene resin (product name "J-762HP," block polymer, manufactured by Prime Polymer Co., Ltd.) (hereinafter also referred to as "bPP") as a polyolefin resin was used, and a test piece for physical properties measurements was injection molded and then evaluated. Table 2 shows the results.

Comparative Example 2

Pellets of a thermoplastic resin composition were fabricated in the same manner as in Comparative Example 1, except that a polypropylene resin (product name "J-762HP," block polymer, manufactured by Prime Polymer Co., Ltd.) (hereinafter also referred to as "bPP") as a polyolefin resin was used, and a test piece for physical properties measurements was injection molded and then evaluated. Table 2 shows the results.

Example 6

Pellets of a thermoplastic resin composition were fabricated in the same manner as in Example 2, except that a PA6 (nylon 6 resin, product name "Amilan CM1007," melting point 225° C., manufactured by Toray Industries, Inc.) was used as a polyamide resin, and a test piece for physical properties measurements was injection molded under the conditions of an injection temperature of 245° C. and mold temperature of 40° C. and then evaluated. Table 2 shows the results.

Comparative Example 3

Pellets of a thermoplastic resin composition were fabricated in the same manner as in Comparative Example 1, except that a PA6 (nylon 6 resin, product name "Amilan CM1007," melting point 225° C., manufactured by Toray Industries, Inc.) was used as a polyamide resin, and a test piece for physical properties measurements was injection molded under the conditions of injection temperature of 245° C. and mold temperature of 40° C. and then evaluated. Table 2 shows the results.

Example 7

Pellets of a thermoplastic resin composition were fabricated in the same manner as in Example 6, except that the modified elastomer (b-1) obtained in Synthesis Example 1 was used as a compatibilizer, and each pellet was dry blended so that it was compounded in the amount listed in Table 2, and a test piece for physical properties measurements was injection molded and then evaluated. Table 2 shows the results.

Example 8

Pellets of a thermoplastic resin composition were fabricated in the same manner as in Example 6, except that the modified elastomer (b-2) obtained in Synthesis Example 2 was used, and each pellet was dry blended so that it was compounded in the amount listed in Table 2, and a test piece for physical properties measurements was injection molded and then evaluated. Table 2 shows the results.

Comparative Example 4

Pellets of a thermoplastic resin composition were fabricated in the same manner as in Comparative Example 3, except that each pellet was dry blended so that it was compounded in the amount listed in Table 2, and a test piece for physical properties measurements was injection molded and then evaluated. Table 2 shows the results.

TABLE 2

| | | Units | Example 1 | Example 2 | Example 3 | Comparative Example 1 | Example 4 | Example 5 |
|---|---|---|---|---|---|---|---|---|
| Polyamide resin | PA11 | wt % | 25 | 25 | 25 | 25 | 25 | 25 |
| | PA6 | wt % | | | | | | |
| Compatibilizer | b-1 | wt % | 20 | | | | | |
| | b-2 | wt % | | 20 | | | 20 | |
| | b-3 | wt % | | | 20 | | | 20 |
| | b-4 | wt % | | | | 20 | | |
| Polyolefin resin | hPP | wt % | 55 | 55 | 55 | 55 | | |
| | bPP | wt % | | | | | 55 | 55 |
| Stiffness | Flexural modulus of elasticity | MPa | 890 | 860 | 940 | 850 | 540 | 430 |
| Puncture impact test (23° C.) | Puncture point displacement | mm | 21.3 | 20.9 | 20.2 | 20.3 | 23.4 | 23.7 |
| | Puncture point energy | J | 9.8 | 10.2 | 9.8 | 9.1 | 8.8 | 9.3 |
| Puncture impact test (−30° C.) | Puncture point displacement | mm | 17.0 | 17.0 | 16.3 | 15.8 | 19.8 | 20.5 |
| | Puncture point energy | J | 9.0 | 10.1 | 10.3 | 8.2 | 11.5 | 12.2 |

| | | Units | Comparative Example 2 | Example 6 | Comparative Example 3 | Example 7 | Example 8 | Comparative Example 4 |
|---|---|---|---|---|---|---|---|---|
| Polyamide resin | PA11 | wt % | 25 | | | | | |
| | PA6 | wt % | | 25 | 25 | 20 | 20 | 20 |
| Compatibilizer | b-1 | wt % | | | | 25 | | |
| | b-2 | wt % | | 20 | | | 25 | |
| | b-3 | wt % | | | | | | |
| | b-4 | wt % | 20 | | 20 | | | 25 |

TABLE 2-continued

| | | | | | | | | |
|---|---|---|---|---|---|---|---|---|
| Polyolefin resin | hPP | wt % | | 55 | 55 | 55 | 55 | 55 |
| | bPP | wt % | 55 | | | | | |
| Stiffness | Flexural modulus of elasticity | MPa | 500 | 980 | 990 | 770 | 720 | 780 |
| Puncture impact test (23° C.) | Puncture point displacement | mm | 23.7 | 19.9 | 19.1 | 20.5 | 21.0 | 19.9 |
| | Puncture point energy | J | 9.2 | 9.5 | 8.3 | 8.4 | 8.8 | 8.3 |
| Puncture impact test (−30° C.) | Puncture point displacement | mm | 18.6 | 15.1 | 14.3 | 15.1 | 16.0 | 13.6 |
| | Puncture point energy | J | 10.6 | 7.5 | 7.0 | 7.5 | 8.9 | 6.0 |

The invention claimed is:

1. A thermoplastic resin composition comprising a polyamide resin (A), a compatibilizer (B) and a polyolefin resin (C), wherein the compatibilizer (B) is a modified ethylene-based elastomer that is modified with an unsaturated carboxylic acid and that has a density of 850 to 866 $kg/m^3$, wherein the polyolefin resin (C) is a polypropylene resin, and a content proportion of the polyamide resin (A) is 15 to 30% by mass, a content proportion of the compatibilizer (B) is 15 to 30% by mass, and a compounding proportion of the polyolefin resin (C) is 45 to 65% by mass, based on 100% by mass of a total content of the polyamide resin (A), the compatibilizer (B), and the polyolefin resin (C).

2. The thermoplastic resin composition according to claim 1, wherein an ethylene-based elastomer before modification to obtain the modified ethylene-based elastomer is an olefinic thermoplastic elastomer comprising a polymer of ethylene and an α-olefin having 3 to 8 carbon atoms.

3. The thermoplastic resin composition according to claim 1, wherein the polyamide resin (A) is at least one selected from the group consisting of polyamide 11, polyamide 12, polyamide 612, polyamide 610, polyamide 1010, and polyamide 6.

4. A method for producing the thermoplastic resin composition according to claim 1, comprising a step of melt kneading a resin obtained by melt kneading a polyamide resin (A) and a compatibilizer (B), with a polyolefin resin (C).

5. A method for producing the thermoplastic resin composition according to claim 2, comprising a step of melt kneading a resin obtained by melt kneading a polyamide resin (A) and a compatibilizer (B), with a polyolefin resin (C).

6. A method for producing the thermoplastic resin composition according to claim 3, comprising a step of melt kneading a resin obtained by melt kneading a polyamide resin (A) and a compatibilizer (B), with a polyolefin resin (C).

* * * * *